Aug. 9, 1966 J. G. GARBIN 3,265,489
GLASS SHEET BENDING MOLD WITH HORIZONTAL SUPPORT SURFACES
Filed Nov. 28, 1962 3 Sheets-Sheet 1
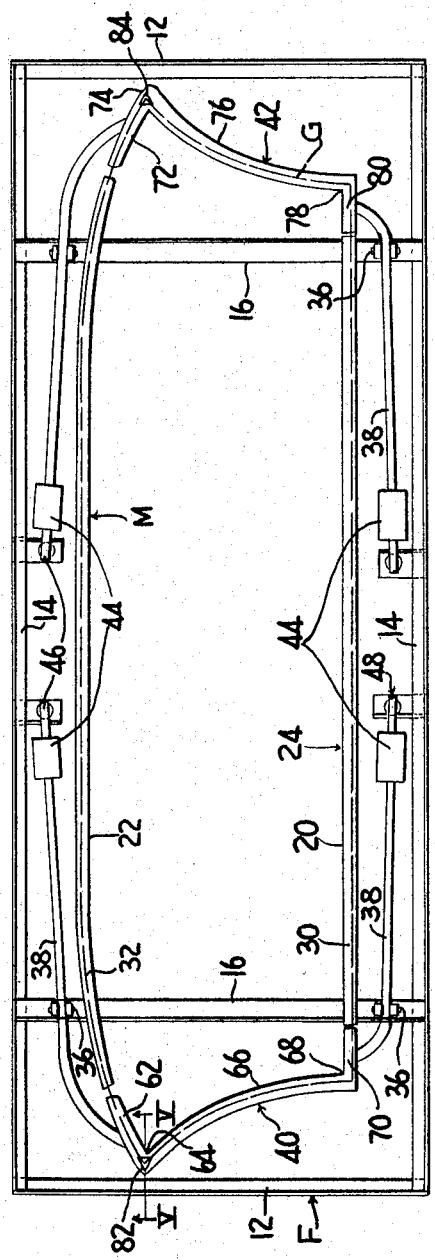
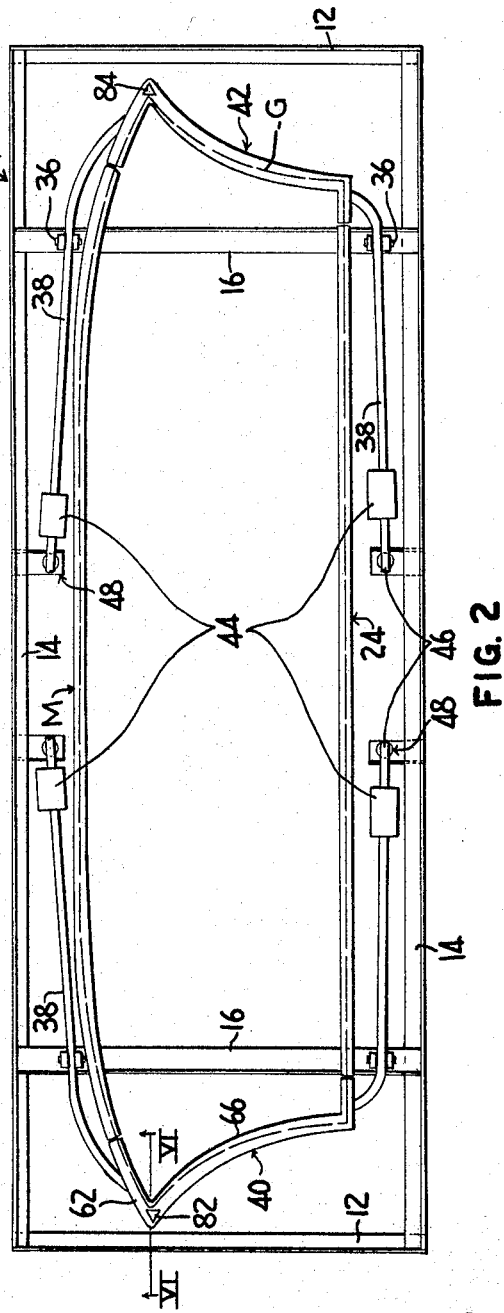
INVENTOR.
JOHN G. GARBIN
BY
Oscar L. Spencer
ATTORNEY

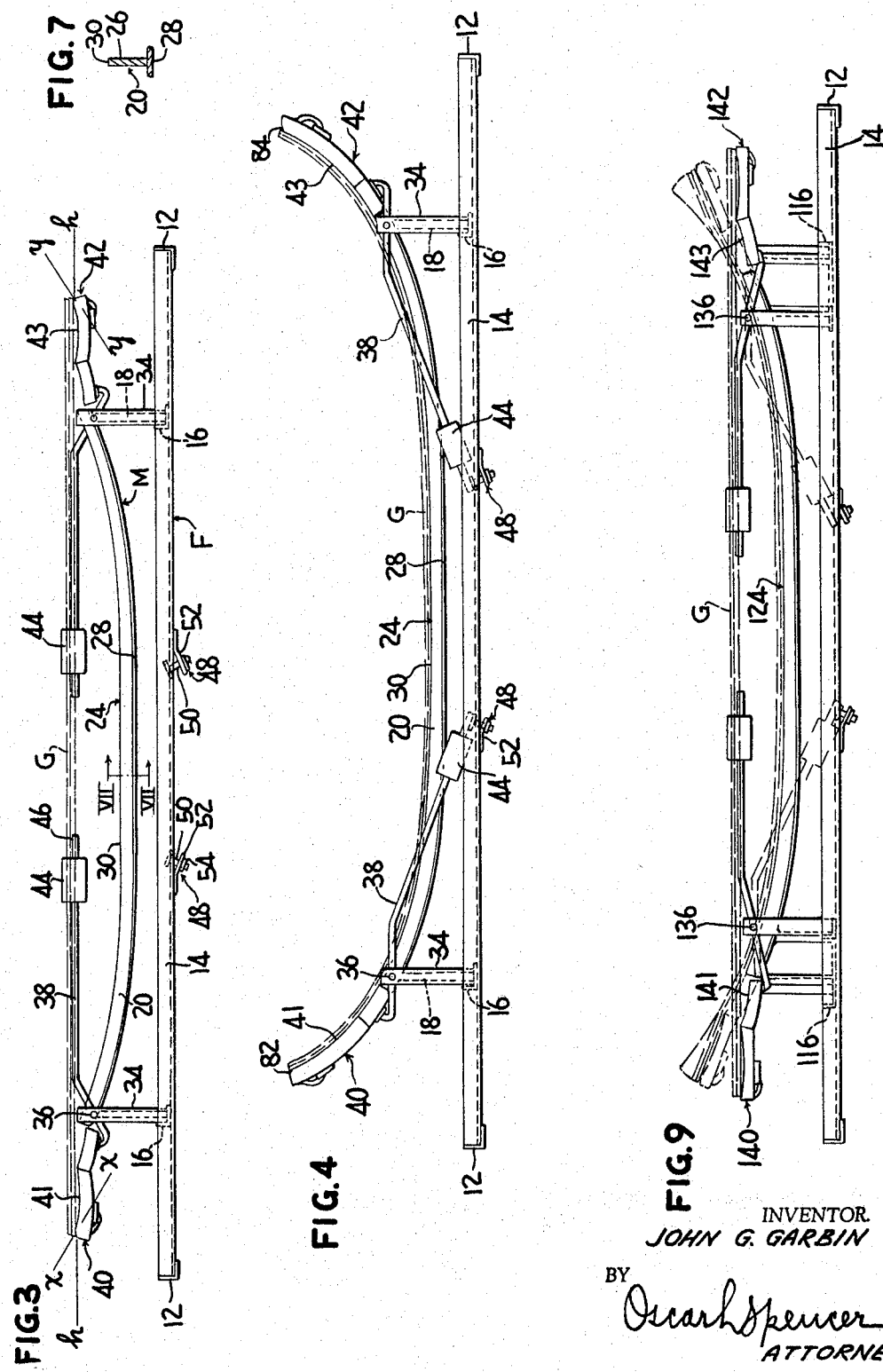

Aug. 9, 1966   J. G. GARBIN   3,265,489
GLASS SHEET BENDING MOLD WITH HORIZONTAL SUPPORT SURFACES
Filed Nov. 28, 1962   3 Sheets-Sheet 3

INVENTOR.
JOHN G. GARBIN
BY Oscar H. Spencer
ATTORNEY

United States Patent Office 3,265,489
Patented August 9, 1966

3,265,489
GLASS SHEET BENDING MOLD WITH HORIZONTAL SUPPORT SURFACES
John G. Garbin, Greensburg, Pa., assignor to Pittsburgh Plate Glass Company, Pittsburgh, Pa., a corporation of Pennsylvania
Filed Nov. 28, 1962, Ser. No. 240,495
5 Claims. (Cl. 65—291)

This invention relates to Bending Glass Sheets and particularly relates to sectionalized glass sheet bending molds of the outline type specifically designed to minimize overbending of the tips of glass sheets bent to irregular shapes.

The flat glass industry has developed sectionalized skeletonized glass sheet bending molds for bending glass sheets of nonrectangular outline to non-uniform curvatures. These molds have an outline shaping surface of concave elevation conforming in both shape and outline to that of the bent glass.

The shaping surface is formed by the upper surfaces of spaced, elongated rails comprising a center mold section and by the upper surfaces of additional rails comprising end mold sections pivoted to the center mold section by means of hinges for movement from a spread mold position to support a flat glass sheet into a closed mold position wherein the upper surfaces of the end mold section rails form continuations of the upper surfaces of the center section rails to form an outline shaping surface that supports the undersurface of the glass sheet after bending along its marginal portion. The mold members or sections are usually composed of stainless steel or other like material that does not soften at the elevated temperatures needed to bend glass sheets.

Two glass sheets of substantially the same thickness having a total nominal thickness of one-quarter inch are bent in pairs and subsequently laminated or single glass sheets of the total nominal thickness are bent and subsequently tempered according to present commercial practice. Glass sheets of soda-lime-silica composition are usually exposed for 20 to 30 minutes at elevated temperatures of about 1250 degrees Fahrenheit to produce the required bends. Usually the bending itself takes only a few seconds at the end of the heating cycle.

The sectionalized molds described above are especially effective in producing curvatures necessary for present day "wrap-around" windshields. The latter extend continuously across the entire front of an automobile and have their longitudinal extremities curved sharply into the sides of the vehicle relative to a gently bent central portion.

The end mold sections are preferably counterweighted by means of counterweighted lever arms attached to the end mold sections and extending longitudinally inward from the hinges to cause the attached end mold sections to rotate upward from the spread mold position to the closed mold position in response to the softening of the glass sheet upon exposure to the elevated temperatures. The end mold sections pivot through an acute angle relative to the hinge axes from the spread mold position to the closed mold position.

In order to support glass sheets of nonrectangular outline in nontilting relation with respect to the shaping surface, the prior art molds made provision for intermediate supports which formed part of the mold construction. The most effective of these constructions for providing nontilting support for the glass involved constructing and arranging the mold sections with respect to the hinges in such a manner that the longitudinal extremities of the center mold section rails contacted the undersurface of the flat glass sheet intermediate its longitudinal extremities and adjacent its side edges when the end sections were rotated into the spread mold position. Such a construction is disclosed in U.S. Patent No. 2,924,045 to Paul Startzell.

The most effective molds of this type in the prior art include a support frame which provides solid support for the central mold section. Another characteristic of these most effective molds is the absence of edge surface contacting members which apply a longitudinal compressive force which distorts the end edges of the edge contacted sheets.

When the end mold sections of this type of mold rotate into a spread mold position, they engage the bottom surface only of the flat glass sheet to support the latter as a beam adjacent its longitudinal extremities. The flat glass sheet is also supported near its side edges and intermediate its ends by the ends of the center mold section rails.

According to present commercial practice, such glass-laden molds are successively conveyed laterally through a tunnel-like bending lehr. In the lehr, the molds are first conveyed through a preheat zone where they are exposed to successive patterns of increasing temperatures until they reach a temperature just below the glass softening point. Then they are exposed to a bending zone whose temperature patterns include spaced regions of relatively high temperature that irradiate the regions of the glass sheet to be bent sharply. This latter temperature pattern is necessary because the portions of a glass sheet to be bent sharply must pass through the spaced regions of relatively high temperature while the central portions of the glass sheets which are to be bent relatively gently simultaneously pass through the intermediate regions of relatively low temperature.

When glass-laden molds are subjected to glass softening temperatures, the central portion of the glass sheet sags to conform to the upper shaping surfaces of the center mold section rails, while the end mold sections rotate upward into the closed mold position, thus lifting the soft glass sheet extremities from a flat to a curved configuration.

In the past, any transverse section of the shaping surface of the end and center mold sections presented a flat planar upper surface for each of the molding sections. When the end mold sections were pivoted into the spread position for supporting the end portions of the flat glass sheets inward of their extremities preparatory to bending, their upper surfaces at the extreme ends of the mold were oriented in oblique planes and the outer corner between the upper surface and the outer wall of the mold rail tended to provide a thin line along which an upward lifting thrust was applied to the horizontally disposed undersurface of the glass sheet.

Prior to the present invention, the art did not appreciate that the oblique orientation of the endmost portions of the mold shaping surface with respect to the undersurface of the flat glass sheet and the resulting thin line of application of upward lifting force caused overbending and marring of the glass sheet longitudinal extremities. These defects were emphasized in cases where the glass sheets and the molds had pointed tips.

The prior art has attempted to avoid mold marking at pointed tips of glass sheets during bending by attaching a pin above the ends of the mold shaping surface for engaging the glass tip plus supports for engaging the flat glass above the mold shaping surface intermediate its extremities as depicted in U.S. Patent No. 2,925,688 to Carson. Unfortunately, such construction requires glass edge engaging members which compress the glass sheet longitudinally in order to avoid overbending. In addition, the intermediate supports required for such construction must be precisely made and require many moving parts which go out of order and require frequent maintenance due to mishandling and the exposure of the moving parts to repeated temperature cycles.

The present invention overcomes these problems of the prior art by providing the outer portion of the shaping surface of each endmost mold section with an area that extends downward and longitudinally outward from the remainder of the upper shaping surface of the end mold section at an angle sufficient to be disposed in a substantially horizontal plane to be in flat contact with the undersurface of the flat glass sheet when the end mold section is pivoted into the spread mold position. According to the teachings of the present invention, the area of the horizontally disposed flat area portion in flatwise contact with the flat glass sheet must be greater than the square of the thickness of the supported glass, preferably at least twice the square of the glass thickness, but not more than about six times thereof. For a nominal glass thickness of ¼ inch, the usual glass thickness for windshields or backlights in passenger vehicles, the area of each portion calculates to be from about .06 square inch to about .4 square inch.

The end mold section constructed according to the present invention applies an upward thrust through its horizontally disposed area to the undersurface of the flat glass sheet as it is heat-softened to a temperature sufficient to sag the sheet appreciably. This upward force is applied over an area sufficiently large to avoid imprinting a localized point or line onto the bent sheet which resulted from application of this upward force by prior art apparatus. In addition, the present invention avoids marking and curling at the longitudinal extremities by virtue of the fact that only the glass tip portion forming a corner or a point is in flatwise contact with the mold and has its heating retarded. Therefore, the relatively stiff glass sheet corner portion remains stiff when it rotates into ultimate contact with the shaping surface of the end mold section while the regions exposed to the spaced intensely heated regions within the bending lehr bend sharply to fold the ends upward with respect to the central region.

When employing molds constructed according to the present invention, the areas of support for the glass extremities provide sufficient frictional support to prevent longitudinal misalignment between the glass and the mold, yet are not so large as to require the end portions in contact with metal to be cut off after bending as is required when using the construction of U.S. Patent No. 2,872,756 to Jendrisak.

As the intensely heated regions of the glass sheet sag more rapidly than either the outermost portions or the central portions thereof, the portions outward of the sharply bent regions are lifted upward while those inward of the intensely heated regions sag to conform to the middle portion of the shaping surface. The regions along the side edges of the glass sheet initially supported on the extremities of the center section shaping rails are temporarily lifted off these support points when the glass sheet is folded upward and its central portion deposited on the central portion of the outline shaping surface.

Each longitudinal marginal edge of the glass tends to conform to the shape of the upper surfaces of the center section rails in a longitudinally outward direction while the upward folding of the longitudinal extremities continues. The outermost corners of the glass remain in substantially flatwise contact with the flat areas of support because the end sections and their flat glass end supporting areas rotate upward in synchronism until a sufficient length of the glass sheet margin is deposited on the center section shaping rails to preclude longitudinal displacement of the glass sheet with respect to the mold.

The corners of the glass sheet are continually in contact with the end molding sections throughout the bending cycle. Hence, they remain relatively stiff and when the sharply bent region of the glass sheet settles into registry with the corresponding portion of the shaping surface, the extremities of the glass pivot promptly within a matter of a few seconds from the initial support area to the shaping surface while remaining relatively stiff. Therefore, during a heating and bending cycle of upwards of 20 minutes, the present invention provides flat area contact and support for each end of the glass sheet subjected to an upward lifting force for all but a few seconds of the cycle. This compares to an inherent support along a line or a point of contact only for virtually the entire heating and bending cycle when employing prior art molds.

The present invention will be understood more clearly after the reader studies the description of certain preferred illustrative embodiments of the present invention.

In the drawings which form part of the description and wherein like reference numbers refer to like structural elements, FIG. 1 is a plan view of one embodiment of a glass sheet bending mold showing its supporting a flat glass sheet preparatory to bending;

FIG. 2 is a view similar to FIG. 1 showing the mold in its closed position;

FIGS. 3 and 4 are longitudinal elevations of the mold depicted in FIGS. 1 and 2, respectively;

FIG. 7 is a sectional view of a center section mold rail taken along the lines VII—VII of FIG. 3;

Figure 11:
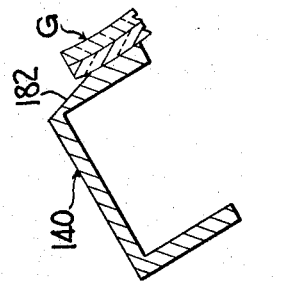
Figure 10:
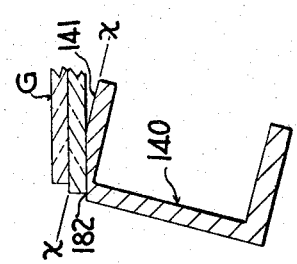
Figure 6:
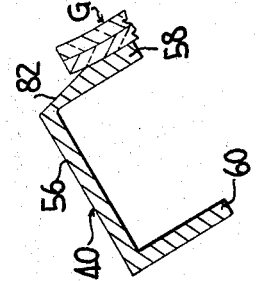
FIGS. 5 and 6 are enlarged sectional views of an end portion of an end mold section showing how the glass extremity is supported before and after bending, respectively, and taken along the line V—V of FIG. 1 and the line VI—VI of FIG. 2.
Figure 5:
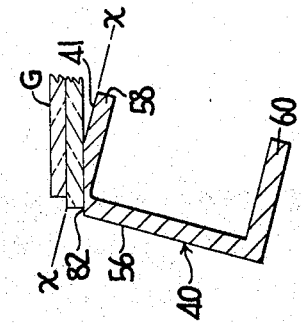
Figure 8:
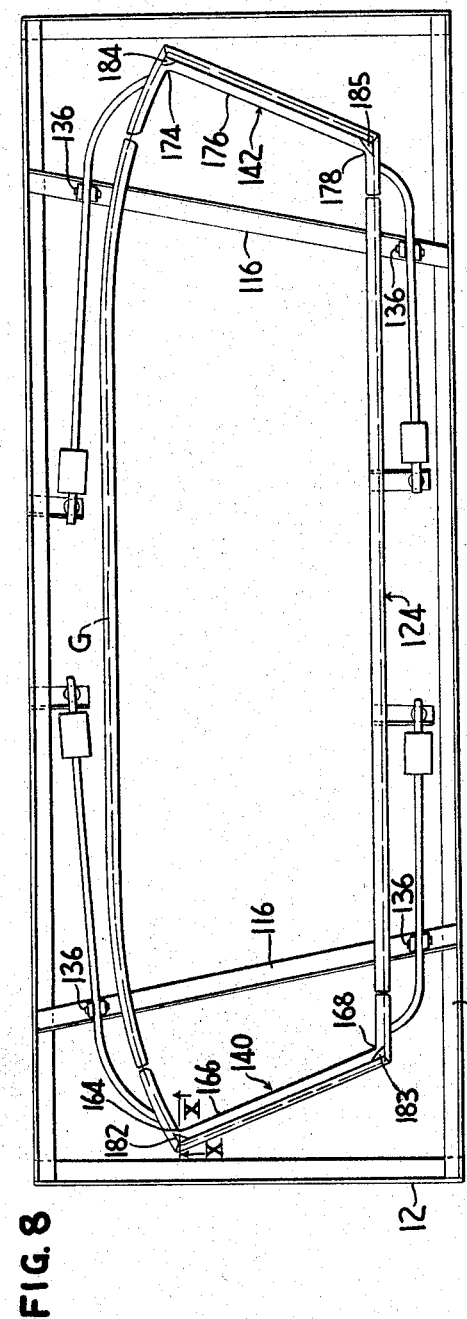
FIG. 8 is a view similar to that of FIG. 2 of a glass sheet bending mold adapted for bending glass sheets having a straight line extremity rather than a pointed extremity portion.

FIG. 9 is an elevational view of the mold of FIG. 8 and shows the mold in its open position in solid lines and in its closed position in phantom; and FIGS. 10 and 11 are views similar to FIGS. 5 and 6 showing how an extremity of the glass sheet is supported on the mold of FIGS. 8 and 9 in the open and closed position, respectively, and is taken along the lines X—X of FIG. 8.

Referring to the drawings, a mold shown generally by reference number M is shown supported on a mold frame F.

The mold support frame comprises a pair of angle iron runners 12 extending transversely along the longitudinal ends of the frame F to support the latter for transverse movement through a tunnel-like furnace (not shown). The runners 12 provide this movement by riding along the top of rotating rolls (not shown) disposed throughout the furnace length as part of a roll-type conveyor. A pair of longitudinally extending angle irons 14, which form the longitudinal side edges of the support frame F, are connected to the upper surface of the horizontal flange of the angle iron runners 12 so as not to impede the movement of the runners along the conveyor rolls.

Cross pieces 16 interconnect longitudinally extending angle irons 14 or frame F intermediate their extremities. Each cross piece 16 carries a pair of spaced vertical posts 18. Four posts 18 are provided for the apparatus. Two of the posts support each one of a pair of shaping rails 20 or 22 of a center mold section 24 of the mold M.

Each of the center section rails 20 and 22 is of inverted T-cross section as shown in FIG. 7 and comprises a rail 26 extending lengthwise with its width oriented vertically and an additional rail 28 attached to the lower surface of rail 26 with its width oriented horizontally. The upper edge of the vertically oriented rail 26 is designated by reference number 30 for center section shaping rail 20 and by reference number 32 for center section shaping rail 22.

Each cross piece 16 also supports one or more uprights 34, extending vertically upward from said cross piece 16. Each upright is apertured near its upper end to receive a hinge pin 36. The hinge pin extends through an aperture in a lever arm 38 to form a pivotal connection between each upright and each lever arm.

Hinge pins 36 serve as hinge means for pivoting the lever arms 38 with respect to the mold support frame F. Each lever arm 38 is attached at its longitudinally outer extremity to one of a pair of end mold sections 40 or 42, pivotally attached to the frame F at either end of the center mold section 24. End mold section 40 has an upper ledge-type shaping surface 41, while end mold section 42 is provided with a similar surface 43.

A weight 44 is mounted on each lever arm 38 adjacent its longitudinally inner end. Each lever arm 38 has an inner end portion 46 which rotates with respect to the hinges 36 in substantially vertical planes.

A stop member 48, comprising a set screw 50 extending through an apertured plate 52, is disposed in the path of movement of the inner end portion 46 of each of the lever arms 38. Lock nuts 54 are threaded on the set screw 50 on opposite sides of the plate 52 to position the set screw 50 at a position determining the closed position for the end mold sections 40 and 42 with respect to the central mold section 24. The latter position is determined when the inner end portions 46 contact the upper surfaces of the set screws 50. Each apertured plate 52 extends laterally inward from a line of attachment at its outer end to one of the angle irons 14.

Each end mold section 40 and 42 is generally of channel shape in cross-section, as shown in FIGS. 5 and 6. The channel shaped member is disposed on its side with a channel web 56 interconnecting an upper flange 58 having the upper ledge-type shaping surface 41 or 43 formed thereon and a lower flange 60 provided for reinforcement. Each channel shaped member forming an end molding section 40 or 42 is shaped so that the upper ledge-type shaping surface 59 of its upper flange 58 conforms to the outline of each longitudinal extremity of the bent glass sheet and in effect forms a continuation of the shaping surfaces 30 and 32 of center section rails 20 and 22 in the closed mold position.

The sectionalized bending mold described thus far is a typical prior art sectionalized counterweighted bending mold. When such a mold is moved to the open mold position as depicted in FIG. 3, the outermost extremity of the shaping surface lies in an oblique plane $x$—$x$ for end section 40 and oblique plane $y$—$y$ for end section 42 which would apply an upward lifting force along a line of contact between each end mold section and the extremity portion of the glass supported throughout the seating and bending cycle if the mold were not modified as provided by the present invention.

This linear application of upward force is present in prior art molds because the outermost extremity of the flat glass sheet preparatory to bending lies in a horizontal plane and the outermost portion of the shaping surface lies at an oblique angle to the horizontal plane of support for the glass sheet.

In the particular mold illustrated in FIGS. 1 through 6, the ledge-type shaping surfaces 41 and 43 of end molding sections 40 and 42 are modified at their pointed outermost extremities. End molding section 40 comprises a generally longitudinally extending channel-shaped portion 62 which forms a pointed extremity portion 64 at one longitudinal extremity of a generally arcuately shaped transverse portion 66 of the channel-shaped member. The other extremity of the transverse portion 66 forms a corner 68 with another longitudinally extending portion 70 of the channel-shaped member forming the end mold section 40. The longitudinal portions 62 and 70 extend longitudinally inward from corners 64 and 68, respectively, and terminate at their longitudinally inner end adjacent a longitudinal extremity of the center section shaping rails 22 and 20, respectively, with the upper surface 41 of flanges 58 forming continuations of shaping surfaces 32 and 30 in the closed mold position depicted in FIGS. 2 and 4.

Similarly, end mold section 42 comprises a longitudinal portion 72 similar to that of the longitudinal portion 62 extending generally longitudially outwardly from the opposite end of the shaping surface 32 of the center section shaping rail 22 to form a corner 74 similar to the corner 64 at the other longitudinal extremity of the mold M with transverse arcuate portion 76 which is substantially a mirror image of transverse arcuate portion 66. Transverse arcuate portion 76 forms a corner 78 similar to the corner 68 with another longitudinal portion 80 which extends longitudinally inward from the corner 78 to the other longitudinal extremity of shaping surface 30 of the center section shaping rail 20 from that adjacent which longitudinal portion 70 of end mold section terminates.

An area 82 extends obliquely downward and longitudinally outward of the outer portion of the ledge-type shaping surface 41 of end mold section 40. An additional area 84 extends downward and longitudinally outward of the outer portion of the ledge-type shaping surface 43. The angles between the areas 82 and 84 and the outer portions of ledge-type shaping surfaces 41 and 43, respectively, are such that areas 82 and 84 lie in horizontal planes in the spread mold position. Therefore, they remain in flatwise surface-to-surface contact with a considerable area of the glass sheet extremity portions throughout substantailly the entire heating and bending cycle or until the glass sheet sags an appreciable amount toward the mold shaping surface.

Since the flat glass sheet extremities are supported on horizontally disposed areas making flatwise contact with the glass rather than the outer ends of the shaping surface which formed a pointed extremity, the present invention eliminates the factors that caused gouging of the glass extremities and that also tended to cause the glass to bend to a greater extent than desired at the tips which were desired to be maintained relatively flat.

*Example I*

A typical bending mold construction for bending a pair of glass sheets has the outline shown in FIGS. 1 and 2, a tip-to-tip distance of 59¼ inches, a lateral spacing between the center section shaping rails at the center of the mold of 23⅞ inches and utilizes a flat area of equilateral triangular configuration having a length of ⅝ inch on each side. The square of the thickness of the supported glass sheets is .0625 square inch, whereas the area of the flat glass tip support area is .180 square inch or 2.88 times the square of the glass thickness.

In the typical example, the channel-shaped members forming the end mold sections comprised ⅛ inch channels having a width of ½ inch for the upper and lower flanges and 1½ inches high webs. At the pointed extremities, the horizontal portions were formed by recessing the channel member to form the area 82 or 84 by grinding the upper surface to form equilateral triangular areas of support having each side ⅝ inch long. The upper surfaces of areas 82 and 84 were made smooth by filing and sanding with emery cloth.

With reference to FIGS. 8 through 11, an alternate embodiment of the present invention is disclosed. Since most elements of the alternate embodiment are identical with those of the first embodiment, only those differing in construction will be described in detail for the alternate embodiment.

The cross pieces 116 of the mold frame of the alternate embodiment are similar to the cross pieces 16 of the first embodiment except for the fact that they extend diagonally in order to provide diagonal support for the uprights supporting the hinge pins 136 which serve the same purpose as the hinge pins 36 of the first embodiment, that is, to pivot the end mold sections 140 and 142 with respect to the center mold section 124.

The end mold sections 140 and 142 are pivotally connected with respect to the mold frame through the hinges 136 about axes extending obliquely with respect to the longitudinal dimension of the mold so that the transverse portion 166 of end mold member 140 and the transverse portion 176 of end mold member 142 which are equivalent to transverse portions 66 and 76 of the first embodiment are constructed to provide horizontal area portions 182 and 183, which replace upper surface area 82 of the first embodiment, at corners 164 and 168 of end mold member 140, and horizontal area portions 184 and 185, which replace upper surface area 84, at corners 174 and 178 of end mold member 142. Thus, in the alternate embodiment two corner areas of support are provided for the longitudial extremities of the glass sheet. The triangular area of horizontal support for each corner of the glass sheet must be greater than the square of the glass thickness supported on the mold.

In both embodiments of the present invention, the distance between the horizontally disposed areas measured in a flat plane in the spread mold position is substantially equal to the distance therebetween in the closed mold position measured lengthwise along the curved shaping surface.

It is understood that the method of providing flatwise support for the longitudinal extremity portions of the flat glass sheets suggested by the present invention throughout the portion of the heating and bending cycle prior to the moment the glass sheet sags appreciably may be employed where one end only of the glass sheet is to be lifted or folded upward with respect to the main portion of the glass sheet to produce a shape suitable for a rear-quarter light for a station wagon or a half windshield, for example.

It is also understood that the flatwise corner or pointed tip support for one or both longitudinal extremities of the supported flat glass sheet may be provided on a glass bending mold that is not sectionalized without departing from the spirit of the present invention as long as the supported area is sufficiently large to avoid a line or point contact and sufficiently small to enable the thermal capacity of the stainless steel bending mold to have a selective temperature moderating effect on a tip or a corner rather than an entire end area portion of the glass sheet.

The forms of the invention shown and described in this disclosure represent an illustrative preferred embodiment and a modification thereof. It is understood that various changes may be made without departing from the spirit of the invention as defined in the claimed subject matter which follows. In the claims, the term "corner" is intended to cover a pointed tip wherein edge surfaces of a supported glass sheet meet at an acute angle as well as blunt corners where the angle between adjacent edge surfaces may be any size from acute to obtuse.

What is claimed is:

1. In a sectionalized outline mold for bending glass sheets for use as curved windows in passenger vehicles, a centrally disposed molding member including a pair of shaping rails having upper shaping surfaces extending generally longitudinally along the longitudinal side edges of said mold to form side edge portions of an outline shaping surface, and end molding members having inner and outer longitudinal extremities, said end molding member being mounted for pivotal movement with respect to said shaping rails between a spread mold position wherein said outer longitudinal extremities support the longitudinal extremities of a flat glass sheet and a closed mold position wherein said inner longitudinal extremities are adjacent the ends of said shaping rails, each end molding member having an upper ledge-type shaping surface forming a continuation of the side edge portions of the outline shaping surface in said closed mold position, the outer extremity portion of each said end molding member having an upper surface area extending downward and longitudinally outward from the remainder of the upper shaping surface of said end molding member at an angle sufficient to be disposed in a substantially horizontal plane in said spread mold position, said upper surface area being between about .06 square inch and about .4 square inch, said molding members of said outline mold being movable between a spread position wherein said downwardly and longitudinally outward extending area contacts only the undersurface of a longitudinal extremity of said flat glass sheet forming the longitudinal extremity of the ultimate product and a closed position wherein said molding members form a substantially continuous shaping surface conforming in elevation and outline to said ultimate product.

2. A mold as in claim 1, wherein the longitudinal extremities of said upper shaping surfaces of said longitudinal shaping rails lie in a common plane with each said upper surface area of said outer extremity portions in the spread mold position, the distance between said upper surface areas of said outer extremity portions measured in a straight line along said common plane in the spread mold position being substantially equal to said distance therebetween measured along the curvature of said shaping surface in said closed mold position.

3. In a mold for bending glass sheets for use as curved windows in passenger vehicles, a plurality of molding members including an end molding member forming an end of said mold and movable between a spread position and a closed position, said end molding member comprising a skeletonized shaping member having an upper ledge-type shaping surface adapted to receive a glass sheet after being shaped into contact therewith and forming a continuation of an upper surface of a mold member adjacent thereto in said closed position and an outer surface area on said end molding member extending outward and downward from said upper shaping surface thereof at an angle such that said outer surface area lies in a substantially horizontal plane when said end molding member occupies said spread position, said outer surface area being between about .06 square inch and about .4 square inch, said molding members of said outline mold being movable between a spread position wherein said area extending downwardly and outwardly from said corner portion contacts only a corner portion of said flat glass sheet forming a corner portion of an ultimate product and a closed position wherein said molding members form a substantially continuous shaping surface conforming in elevation and outline to said ultimate product.

4. In a mold for bending glass sheets for use as curved windows in passenger vehicles, a centrally disposed molding member including a pair of shaping rails having upper shaping surfaces extending generally longitudinally along the longitudinal side edges of said mold to form side edge portions of an outline shaping surface, and end molding members having inner and outer longitudinal extremities, said end molding members being mounted for pivotal movement with respect to said shaping rails between a spread mold position wherein said outer longitudinal extremities support the longitudinal extremities of a flat glass sheet and a closed mold position wherein said inner longitudinal extremities are adjacent the ends of said shaping rails, each end molding member having an upper ledge-type shaping surface forming a continuation of the side edge portions of the outline shaping surface in said closed mold position and having a transverse portion at its outer longitudinal extremity extending between corner portions thereof formed at the junction of the outer end of each continuation with an end of said transverse portion, each said corner portion of each said end molding member having an upper surface area extending downward and longitudinally outward from the remainder of the upper shaping surface of said end molding member at an angle sufficient to be disposed in a substantially horizontal plane in said spread mold position, said upper surface area being between about .06 square inch and about .4 square inch, said molding members of said outline mold being movable between a spread position wherein said area extending downwardly and outwardly from said corner portion contacts only a corner portion of said flat glass sheet forming a corner portion of an ultimate product and a closed position wherein said molding members form a substantially continuous shaping surface conforming in elevation and outline to said ultimate product.

5. In a mold for bending glass sheets for use as curved windows in passenger vehicles, a plurality of molding members including an end molding member forming an end of said mold and movable between a spread position and a closed position, said end molding member comprising a skeletonized shaping member having an upper ledge-type shaping surface adapted to receive a glass sheet after being shaped into contact therewith and forming a continuation of an upper surface of a mold member adjacent thereto in said closed position, and having a transverse portion at its outer longitudinal extremity extending between corner portions thereof formed at the junction of the outer end of each continuation with an end of said transverse portion, each said corner portion having an outer surface area extending outward and downward from said upper shaping surface of said end molding member at an angle such that said outer surface area lies in a substantially horizontal plane when said end molding member occupies said spread position, said outer surface area being between about .06 square inch and about .4 square inch, said molding members of said outline mold being movable between a spread position wherein said area extending downwardly and outwardly from said corner portion contacts only a corner portion of said flat glass sheet forming a corner portion of an ultimate product and a closed position wherein said molding members form a substantially continuous shaping surface conforming in elevation and outline to said ultimate product.

References Cited by the Examiner
UNITED STATES PATENTS

| | | | |
|---|---|---|---|
| 2,872,756 | 2/1959 | Jendrisak | 65—290 |
| 2,925,688 | 2/1960 | Carson | 65—290 |

DONALL H. SYLVESTER, *Primary Examiner.*

A. D. KELLOGG, *Assistant Examiner.*